(12) United States Patent
Gerstel et al.

(10) Patent No.: US 9,088,354 B2
(45) Date of Patent: Jul. 21, 2015

(54) POWER SAVE MODE FOR LIGHTPATHS

(71) Applicant: Cisco Technology, Inc., San Jose, CA (US)

(72) Inventors: Ornan Gerstel, Herzliya (IL); Flavio Bonomi, Palo Alto, CA (US); David Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/275,445

(22) Filed: May 12, 2014

(65) Prior Publication Data

US 2014/0248051 A1    Sep. 4, 2014

Related U.S. Application Data

(63) Continuation of application No. 12/586,041, filed on Sep. 15, 2009, now Pat. No. 8,724,990.

(51) Int. Cl.
| | |
|---|---|
| *H04B 10/00* | (2013.01) |
| *H04B 10/079* | (2013.01) |
| *H04J 14/02* | (2006.01) |
| *H04L 12/709* | (2013.01) |
| *H04L 12/801* | (2013.01) |
| *H04L 12/803* | (2013.01) |

(Continued)

(52) U.S. Cl.
CPC ...... *H04B 10/0793* (2013.01); *H04B 10/07955* (2013.01); *H04J 14/0221* (2013.01); *H04J 14/0227* (2013.01); *H04J 14/0267* (2013.01); *H04J 14/0284* (2013.01); *H04L 45/22* (2013.01); *H04L 45/245* (2013.01); *H04L 45/70* (2013.01); *H04L 47/10* (2013.01); *H04L 47/125* (2013.01); *Y02B 60/33* (2013.01)

(58) Field of Classification Search
CPC .......................... H04B 10/0793; H04L 47/125
USPC .......................................................... 398/45
See application file for complete search history.

(56) References Cited

U.S. PATENT DOCUMENTS 7,139,482 B2 * 11/2006 Suzuki et al. ................... 398/57
7,352,966 B2 *  4/2008 Chaudhuri et al. ............... 398/5

(Continued)

OTHER PUBLICATIONS

An International Search Report and a Written Opinion, both dated Jan. 7, 2011, issued during the prosecution of Applicant's PCT/IL2010/000745, Jan. 7, 2011.

(Continued)

*Primary Examiner* — Danny Leung
(74) *Attorney, Agent, or Firm* — Baker Botts L.L.P.

(57) ABSTRACT

A method for communicating optically between nodes of an optical network, including forming, between a first node and a second node of the network, a set of lightpaths, each of the set of lightpaths having a respective configuration, and transferring communication traffic between the first and second nodes via the set of lightpaths. The method also includes forming a determination for the set of lightpaths that a communication traffic level associated therewith is less than a predetermined threshold, and in response to the determination, removing a lightpath having a given configuration from the set of lightpaths to form a reduced set of lightpaths. The method further includes transferring the communication traffic between the first and second nodes via the reduced set of lightpaths, while reducing a level of power consumption in the removed lightpath and while maintaining the given configuration of the removed lightpath.

20 Claims, 3 Drawing Sheets

(51) Int. Cl.
*H04L 12/707* (2013.01)
*H04L 12/721* (2013.01)

(56) References Cited

U.S. PATENT DOCUMENTS

| | | | | |
|---|---|---|---|---|
| 7,616,585 | B1* | 11/2009 | Kritov et al. | 370/252 |
| 2003/0117945 | A1* | 6/2003 | Zboril | 370/216 |
| 2007/0280239 | A1* | 12/2007 | Lund | 370/392 |
| 2008/0049753 | A1* | 2/2008 | Heinze et al. | 370/392 |
| 2008/0101230 | A1* | 5/2008 | Liu et al. | 370/235 |
| 2008/0298236 | A1* | 12/2008 | Ervin et al. | 370/232 |
| 2009/0154455 | A1* | 6/2009 | Diab | 370/389 |
| 2010/0128606 | A1* | 5/2010 | Patel et al. | 370/235 |
| 2011/0064407 | A1* | 3/2011 | Gerstel et al. | 398/45 |
| 2011/0194405 | A1* | 8/2011 | Abbas | 370/221 |

OTHER PUBLICATIONS

C. Hopes, "Analysis of an Equal-Cost Multi-Path Algorithm", RFC 2992, Nov. 2000.

Second Office Action; State IP Office of the People's Republic of China; Application No. 201080041093.2; including English translation, Aug. 5, 2014.

* cited by examiner

POWER SAVE MODE FOR LIGHTPATHS

RELATED APPLICATIONS

This application is a continuation of U.S. application Ser. No. 12/586,041 filed Sep. 15, 2009 entitled "Power Save Mode for Lightpaths" now U.S. Pat. No. 8,724,990.

TECHNICAL FIELD

This disclosure relates generally to optical communication networks.

BACKGROUND

Power dissipation in the optical fibers of an optical network is inherently extremely small, even for relatively large optical power input to the fibers. Any power dissipation that does occur is spread over the lengths of the fibers, so that there is typically no concern about the effects of such dissipation.

On the other hand, other elements in the network, such as router line cards, optical amplifiers, or regenerators, may dissipate relatively large amounts of power, and the power dissipation may be in a small volume. One hub of an optical network, mounted in a cabinet, may easily dissipate 10 kW or more of power in the form of heat. Apart from the actual waste of power, some of which may be inherent in the design of the elements dissipating the power, there is a need to efficiently disperse the heat being generated to prevent over-heating. Forced convection with fans is typically used for the heat dispersal. Because of the nature of the equipment from which the heat is being dispersed, redundancy may typically be built into the forced convection system, adding to the overall cost of the optical network.

As the network elements which dissipate the power reduce in size, the problem of the heat generated, as well as the efficient dispersal of the heat, becomes more acute. There is thus a need to reduce power dissipation in an optical network as much as possible. Such reduction would preferably not affect communication aspects, such as a rate at which signals are transferred, of the network.

BRIEF DESCRIPTION OF THE DRAWINGS

The disclosure will be more fully understood from the following detailed description of the embodiments thereof, taken together with the drawings in which.

DETAILED DESCRIPTION OF EXAMPLE EMBODIMENTS

Overview

Embodiments described herein seek to provide a method for communicating optically between nodes of an optical network. In one embodiment, a set of lightpaths, each having a respective configuration, is formed between a first node and a second node of the network. Communication traffic is transferred between the first and second nodes via the set of lightpaths. In response to a determination for the set of lightpaths that a communication traffic level associated therewith is less than a predetermined threshold, a lightpath having a given configuration is removed from the set of lightpaths to form a reduced set of lightpaths. Communication traffic is transferred between the first and second nodes via the reduced set of lightpaths, while reducing a level of power consumption in the removed lightpath and while maintaining the given configuration of the removed lightpath.

Description

Figure 1:
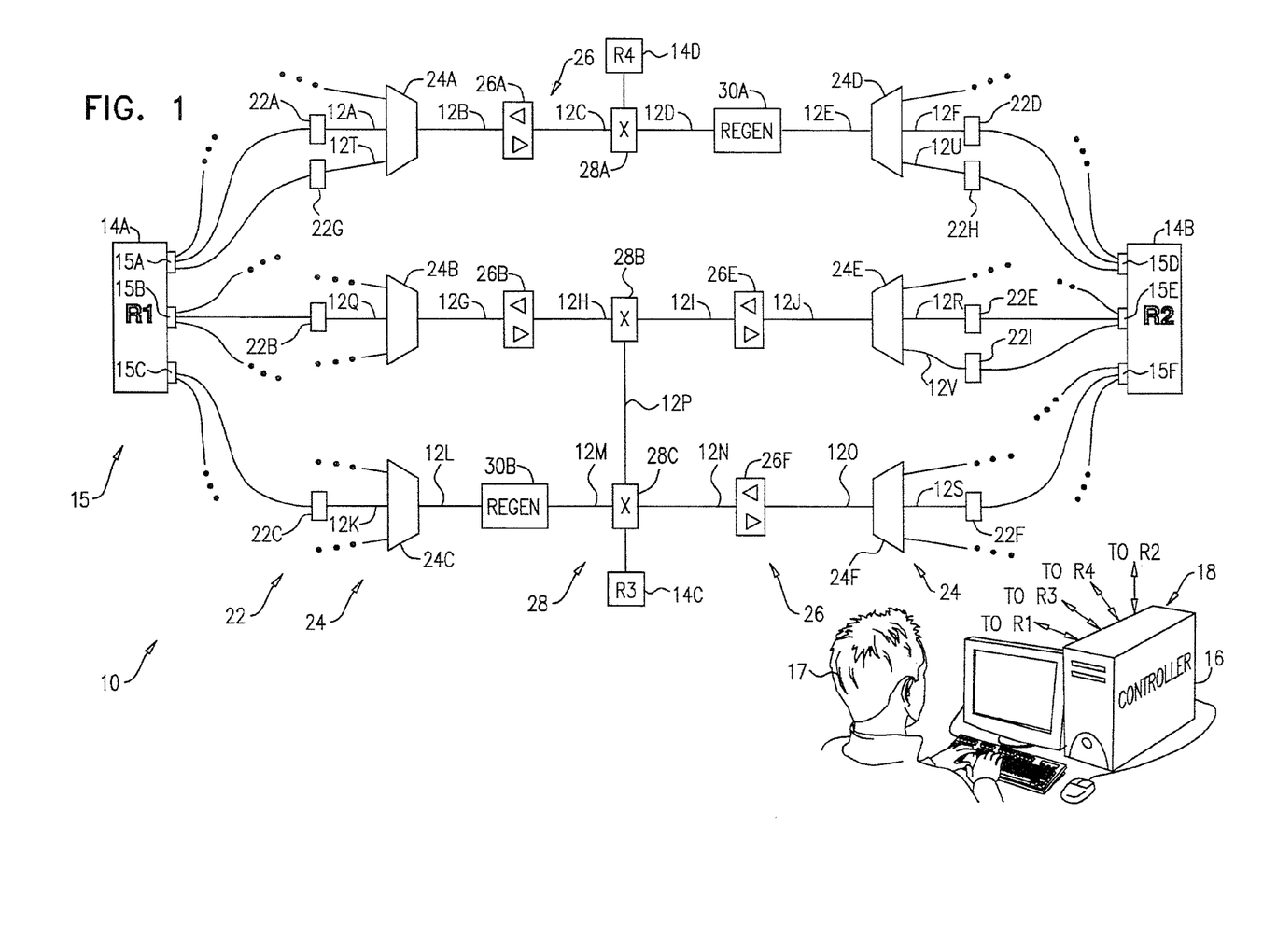
FIG. 1 is a simplified schematic diagram of an optical communication network, according to an embodiment.

Reference is now made to FIG. 1, which is a simplified schematic diagram of an optical communication network 10, according to an embodiment. Network 10 transfers communications within the network using optical dual fibers 12A, 12B, . . . which are configured for full duplex communications. Dual fibers 12A, 12B, . . . comprise respective pairs of fiber strands, each strand typically being configured as a single mode optical transmission line transmitting in either a forward or a reverse direction, although strands configured as multi-mode optical transmission lines may also be used in the network. Optical dual fibers 12A, 12B, . . . are herein also termed optical fibers 12A, 12B, . . . and are generically termed optical fibers 12 or fibers 12. The communication transfer in network 10 is typically implemented using wavelength division multiplexing (WDM) or dense WDM (DWDM), since any one fiber is able to support a multiplicity of wavelengths simultaneously.

However, while for clarity in the explanation of network 10 below communication transfer is assumed to use DWDM, there is no necessity that the communication transfer of embodiments of the disclosure is solely using WDM or DWDM, and other methods may be used to transfer the communications. Such methods include time division multiplexing (TDM) and code division multiplexing (CDM), as well as combinations of these with WDM, DWDM and other multiplexing systems, and those having ordinary skill in the art will be able to adapt the description herein, mutatis mutandis, to account for the differences from DWDM.

By using wavelength multiplexing within network 10 each optical fiber 12 is able to provide multiple optical communication links between optical elements terminating the fiber. In the specification and in the claims, an optical communication link, herein also termed an optical link or simply a link, is defined by the optical fiber carrying the communication and the wavelength transmitted in the fiber that carries the communication. For example, one link in fiber 12A is defined by an identity of the fiber, herein 12A, together with a wavelength, herein termed $\lambda_1$, used to convey communications in the fiber, and a given link of two fiber strands typically uses the same wavelength for both forward and reverse directions of communication. However, while there is no necessity for the wavelengths to be identical, for simplicity in the description herein the wavelengths for the forward and reverse communication directions are assumed to be the same.

In the description hereinbelow, each different type of optical node or element (connected by fibers 12) in network 10 is referred to generically by an identifying numeral, and nodes of the same type are distinguished by appending a letter to the numeral. Thus network 10 comprises routers 14 which are nodes of the network, and by way of example there are assumed to be four routers 14A, 14B, 14C, and 14D in the network. Routers 14A, 14B, 14C, and 14D are also respectively referred to herein as routers R1, R2, R3, and R4. It will be appreciated that embodiments of the disclosure may use platforms for implementation embodiments other than routers, for example, Ethernet switches or crossconnects such as a SONET/SDH crossconnect. All such platforms are assumed to be comprised within the scope of the disclosure.

As is described in more detail below, routers 14 transmit optical signals along lightpaths, also termed "clear channels," that are configured by the routers. In the specification and in the claims, a lightpath is a path, comprising a set of optical links between end points of the lightpath. A single lightpath typically, but not always, uses a single wavelength. If the lightpath uses more than one wavelength, the change between wavelengths is at an optical element, typically a regenerator, in the path that can switch wavelengths.

As is also described below, routers 14 communicate with optical elements of network 10, comprising an optical layer, in order to, inter alia, set up and tear down lightpaths between the elements. The communication includes placing a configured lightpath in a "dim" mode, wherein the lightpath is powered down, but wherein resources used for the lightpath are reserved for future powering up of the lightpath, and are not used for other purposes, such as setting up other lightpaths.

An operator 17 operates the network using a network controller 16. Network controller 16 typically comprises one or more dedicated computing units 18, which may be distributed over the network, and which are configured to operate elements of the network. For example, operator 17 may configure controller 16 to select rates at which signals are to be transmitted within the network, which different wavelengths are to be used for different portions of the network, and power levels at which the different wavelengths are to be used. A typical rate at which signals are transmitted is 40 Gb/s, a typical wavelength used to carry the signals is 1500 nm, and a typical power level is 1 mW. However, any other convenient rates, carrying wavelengths, and/or power levels may be used to transmit signals.

While controller 16 is in overall control of the network, within that overall control some elements of the network are typically able to function substantially autonomously. In the following description, routers 14 are assumed to operate substantially autonomously within the overall control of controller 16.

Each router 14 is assumed to comprise network interface cards 15 (NICs). NICs 15 enable the router to transmit optical signals to, and receive optical signals from, the network, by converting electrical signals generated within the router to the optical signals, and vice versa. NICs 15 are in turn coupled to bidirectional transponders 22, which provide a wavelength conversion between the optical wavelengths generated by the cards and optical wavelengths used in lightpaths that convey traffic signals in network 10. In some embodiments the functions of transponders 22 is incorporated into the interface cards.

For simplicity, only NICs 15A, 15B, and 15C of router 14A, and only NICs 15D, 15E, and 15F of router 14B, are shown in FIG. 1. In addition, also for simplicity, fibers 12 coupling NICs 15 to respective transponders 22 are not separately labeled.

Network 10 comprises multiplexers 24, which also act as demultiplexers, as well as bidirectional amplifiers 26, optical add/drop multiplexers (OADMs) 28, and regenerators 30. As shown in FIG. 1, NIC 15A is coupled to NIC 15D via optical fibers 12 which connect the following elements: transponders 22A, 22G, multiplexer 24A, amplifier 26A, OADM 28A, regenerator 30A, multiplexer 24D, and transponders 22D, 22H. Similarly, NIC 15B is coupled to NIC 15E via transponder 22B, multiplexer 24B, amplifier 26B, OADM 28B, amplifier 26E, multiplexer 24E, and transponders 22E, 22L. NIC 15C is coupled to NIC 15F via transponder 22C, multiplexer 24C, regenerator 30B, OADM 28C, amplifier 26F, multiplexer 24F, and transponder 22F.

Apart from routers 14, the elements of network 10 described above, i.e., transponders 22, multiplexers 24, amplifiers 26, and OADMs 28, are all assumed to be configurable. It is assumed herein, by way of example, that these elements are configured by signals from a router 14 as it sets up or tears down a lightpath. The configuration of each of the elements is according to the type of element. For example, transponders 22 are configured by setting the wavelength which they transmit into, or receive from, the network; OADMs 28 are configured by setting the wavelengths which are to be added/dropped; and if amplifiers 26 comprise erbium doped fiber amplifiers (EDFAs), the configuration of the amplifiers includes the power level of the pump radiation.

Network 10 typically also comprises other network elements that are coupled by fibers 12, such as splitters and optical crossconnects. Except for passive elements such as passive splitters, the other elements are also assumed to be configurable. For simplicity, examples of these other elements are not illustrated in FIG. 1.

Figure 2:
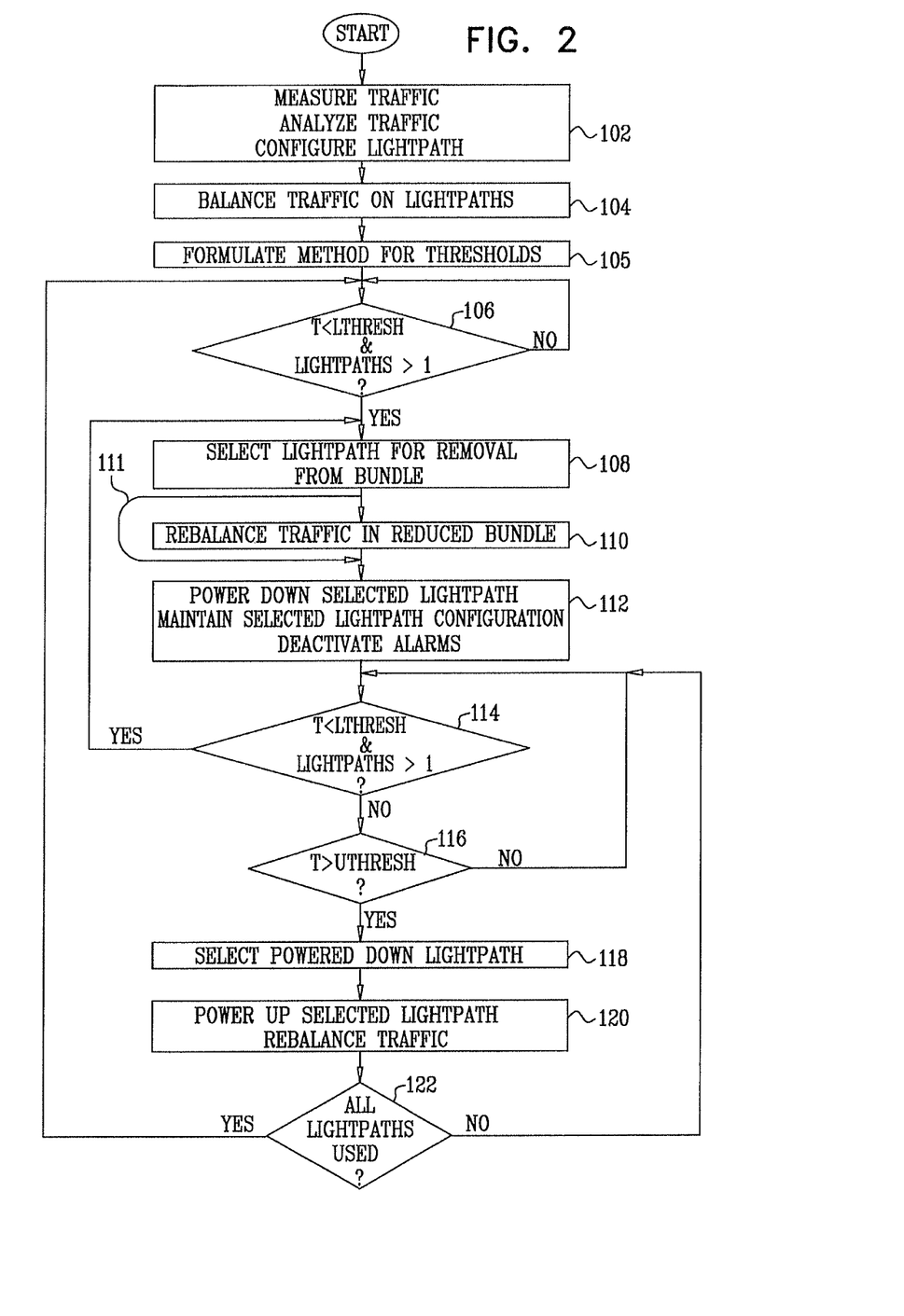
FIG. 2 is a simplified schematic diagram of a flowchart, showing steps performed by a first router in transferring communications between itself and a second router, according to an embodiment.

FIG. 2 is a simplified schematic diagram of a flowchart, showing steps performed by first router R1 in transferring communications between itself and second router R2, according to an embodiment. As stated above, while network 10 may be under overall control of controller 16, elements of the network may function autonomously within limits set by the controller. Hereinbelow, router R1 is assumed to function in such an autonomous manner.

In order to implement the steps of the flowchart, router R1 communicates with the optical layer of network 10. The communication includes signaling between elements of the optical layer and router R1, typically using a signaling protocol such as the RSVP (resource reservation) protocol or an extension thereof. It will be understood that other routers 14 communicate with elements of the optical layer in a similar manner to that described herein for router R1.

In an initial traffic analysis step 102, router R1, acting as a transmitting node, analyzes traffic it receives, and classifies the traffic according to which nodes of the network, herein termed receiving nodes, the traffic is to be directed towards. For example, router R1 may decide that traffic it is receiving is to be directed to routers R2, R3, and R4 acting as receiving nodes. In the initial step router R1 configures respective groups of lightpaths to accommodate the traffic to each of the receiving nodes. Each group of lightpaths is also referred to herein as a link bundle, so that in this case router R1 generates three link bundles.

The following description considers only the link bundle, and traffic in the bundle, between router R1 and router R2. Those having ordinary skill in the art will be able to adapt the description, mutatis mutandis, for traffic between other nodes of network 10.

Tables I-IV show four example lightpaths configured by router R1 for traffic to router R2. Tables I-IV also show the elements in each of the lightpaths. In order to configure each lightpath, Router R1 sends appropriate configuration signals, as described above, to each of the elements in the path.

TABLE I

Lightpath 1

| Element | Link | |
|---|---|---|
| | Fiber | Wavelength |
| Transponder 22A | | |
| | 12A | $\lambda_1$ |
| Multiplexer 24A | | |
| | 12B | $\lambda_1$ |
| Amplifier 26A | | |
| | 12C | $\lambda_1$ |
| OADM 28A | | |
| | 12D | $\lambda_1$ |
| Regenerator 30A | | |
| | 12E | $\lambda_1$ |
| Multiplexer 24D | | |
| | 12F | $\lambda_1$ |
| Transponder 22D | | |

TABLE II

Lightpath 2

| Element | Link | |
|---|---|---|
| | Fiber | Wavelength |
| Transponder 22G | | |
| | 12T | $\lambda_2$ |
| Multiplexer 24A | | |
| | 12B | $\lambda_2$ |
| Amplifier 26A | | |
| | 12C | $\lambda_2$ |
| OADM 28A | | |
| | 12D | $\lambda_2$ |
| Regenerator 30A | | |
| | 12E | $\lambda_4$ |
| Multiplexer 24D | | |
| | 12U | $\lambda_4$ |
| Transponder 22H | | |

TABLE III

Lightpath 3

| Element | Link | |
|---|---|---|
| | Fiber | Wavelength |
| Transponder 22B | | |
| | 12Q | $\lambda_3$ |
| Multiplexer 24B | | |
| | 12G | $\lambda_3$ |
| Amplifier 26B | | |
| | 12H | $\lambda_3$ |
| OADM 28B | | |
| | 12I | $\lambda_3$ |
| Amplifier 26E | | |
| | 12J | $\lambda_3$ |
| Multiplexer 24E | | |
| | 12R | $\lambda_3$ |
| Transponder 22E | | |

TABLE IV

Lightpath 4

| Element | Link | |
|---|---|---|
| | Fiber | Wavelength |
| Transponder 22C | | |
| | 12K | $\lambda_4$ |
| Multiplexer 24C | | |
| | 12L | $\lambda_4$ |

TABLE IV-continued

Lightpath 4

| Element | Link | |
|---|---|---|
| | Fiber | Wavelength |
| Regenerator 30B | | |
| | 12M | $\lambda_2$ |
| OADM 28C | | |
| | 12P | $\lambda_2$ |
| OADM 28B | | |
| | 12I | $\lambda_2$ |
| Amplifier 26E | | |
| | 12J | $\lambda_2$ |
| Multiplexer 24E | | |
| | 12V | $\lambda_2$ |
| Transponder 22I | | |

A link bundle between router Rm and router Rn, where m and n are positive integers, is herein termed $LB_{mn}$. Thus the four lightpaths shown in Tables I-IV comprise a link bundle $LB_{12}$.

In a traffic measuring and balancing step 104, once router R1 has configured link bundle $LB_{12}$, the router measures the traffic on each lightpath of the bundle, and balances the traffic between the lightpaths. The traffic is typically balanced in the link bundle using a traffic balancing protocol such as the Link Aggregation Control Protocol, which is part of IEEE specification 802.3ad, or a protocol based on an equal-cost multi-path routing strategy, as is described at http://tools.ietf.org/html/rfc2992. Once balanced, router R1 measures the traffic in light bundle $LB_{12}$ on a continuing basis.

Alternatively or additionally, in step 104 router R1 may perform inverse multiplexing on the traffic from the router. Inverse multiplexing is known in the art, and spreads a data stream over multiple lightpaths, the spreading being performed at the byte level.

In one embodiment the traffic measurements are instantaneous measurements. Alternatively, the traffic measurements may be averages, formed by applying an averaging parameter such as a window of time to calculate the averages. The traffic measurements may be made in terms of amount of data transmitted in the link bundle in a given time. Alternatively, the measurements may be made as a percentage of an available bandwidth of the link bundle. In the following description, except where otherwise stated, the traffic measurement is assumed by way of example to be as a fraction or a percentage of the available bandwidth.

The following description refers to two types of traffic threshold: a lower threshold and an upper threshold. Lower thresholds correspond to lower bounds for measured traffic in a particular link bundle; and upper thresholds correspond to upper bounds for the measured traffic in the link bundle. As explained in more detail below, if measured traffic crosses a threshold for more than a given time, router R1 changes the link bundle, so that, if a lower threshold is crossed, a lightpath is removed from the bundle, and if an upper threshold is crossed, a lightpath is added to the bundle.

Lower thresholds are generically termed LTHRESH, and are specifically termed LTHRESH(i), where i is an identifier of the link bundle having the lower threshold. Similarly, upper thresholds are generically termed UTHRESH, and are specifically termed UTHRESH(i). Traffic thresholds may be determined substantially as described above for traffic measurements, i.e., in terms of amount of data transmitted in a given time, or in terms of a fraction or a percentage of the available bandwidth.

In a threshold defining step 105, router R1 formulates a method for defining lower and upper thresholds LTHRESH and UTHRESH. In the following description, except where otherwise stated, traffic thresholds are assumed by way of example to be defined as a fraction or a percentage of an available bandwidth.

For example, a given link bundle identified as $LB_n$, n a link bundle identifier, may have LTHRESH($LB_n$) set at x % of an existing available bandwidth of link bundle $LB_n$, and UTHRESH($LB_n$) may be set at y % of the existing available bandwidth of the link bundle, 0<x,y<100. Alternatively, LTHRESH($LB_n$) may be set at x % of the bandwidth of bundle $LB_n$ after a particular lightpath has been removed from the bundle, and UTHRESH($LB_n$) may be set as y % of the bandwidth of bundle $LB_n$ after a particular lightpath has been added to the bundle. Further alternatively, the value of LTHRESH($LB_n$) may be a combination of the two types of LTHRESH($LB_n$) described above, and the value of UTHRESH($LB_n$) may be a combination of the two types of UTHRESH($LB_n$). It will be understood that the values of x and y may be set as fixed or adaptive values by operator 17, typically according to characteristics of network 10, and may vary for different values of n. Furthermore, for thresholds that are dependent on a lightpath being removed from or added to the bundle, the values of the bandwidths used to calculate the thresholds are typically also a function of the particular lightpath being removed or added.

In a first traffic measuring decision 106, router R1 makes measurements of the traffic, T, in link bundle $LB_{12}$. Router R1 determines if the measured traffic T in the link bundle is below a lower bound traffic threshold, LTHRESH($LB_{12}$), for more than a first time period $\Delta T_1$. $\Delta T_1$ is typically in the range of approximately 10 minutes to approximately 30 minutes. In addition, router R1 typically checks that there is more than one lightpath in the bundle.

For decision step 106 the traffic measurement is performed periodically at time intervals $\Delta T_P$, which are typically in a range of approximately 1 minute to approximately 10 minutes. In some embodiments $\Delta T_P$ may be set to be equal to $\Delta T_1$. LTHRESH($LB_{12}$), $\Delta T_1$, $\Delta T_P$, and the averaging parameter, if used, may be preset as fixed values by router R1.

Alternatively, in some embodiments one or more of LTHRESH($LB_{12}$), $\Delta T_1$, $\Delta T_P$ and the averaging parameter may be changed during the operation of network 10, and router R1 may perform such changes adaptively. For example, the interval $\Delta T_P$ between measurements may be set as a function of the variation or change of T between sequential measurements of T. Thus, if there is a large variation of T between such measurements, the period $\Delta T_P$ may be decreased, and if there is a small variation of T between such measurements, the period $\Delta T_P$ may be increased.

As explained below, router R1 uses the measurement in decision 106 to determine if a lightpath can be removed from link bundle $LB_{12}$.

If the measurement of decision 106 returns negative, indicating that the traffic is not below threshold LTHRESH for more than preset time period $\Delta T_1$, the flowchart returns to the beginning of step 106.

If the measurement returns positive, indicating that the traffic is below threshold LTHRESH for more than period $\Delta T_1$, the flowchart continues to a select lightpath step 108.

Typically in decision 106, and as assumed by way of example herein, router R1 also checks if there is only one lightpath in the link bundle. In this case, regardless of the traffic measurement determined as described above, the router assumes that the decision returns negative, and so the flowchart returns to the beginning of step 106. Incorporating the condition that there is at least one lightpath in the bundle ensures that the topology of network 10 is maintained, and avoids re-convergence of the network.

In select step 108, router R1 selects one of the lightpaths in the link bundle for removal from the bundle. Typically, the lightpath selected is the one which, when powered down, effects the largest reduction in power consumption of the lightpaths in the bundle. Alternatively or additionally, the selection may also take into consideration factors such as reduction in operational lifetime of an element in the lightpath if that lightpath is powered down, or that if a particular lightpath is selected the selection enables other elements in network 10, such as a NIC 15 of router R1, to be completely turned off. Other factors may include that a particular lightpath comprises a regenerator in the lightpath, whereas an alternative lightpath does not comprise a regenerator and so uses less power than the lightpath with the regenerator, or that removing different lightpaths results in different bandwidths of the new bundle. As shown in FIG. 2, there are two possible paths from select step 108: a first path directly to a rebalance step 110, and a second path, shown by a line 111, which bypasses a rebalance step 110. The second path is followed if, in decision 106 (or in a decision 114 described below), router R1 determines that there is substantially no traffic on one of the lightpaths in the bundle. In this case, the lightpath having no traffic is the selected lightpath that is removed from the bundle, and traffic in the reduced bundle is already balanced.

If there is traffic in all of the lightpaths, the first path, to rebalance step 110, is followed. In rebalance step 110, router R1 rebalances the traffic between the reduced number of lightpaths in the bundle, using the protocol of step 104.

In a power down step 112, router R1 implements the powering down of the lightpath selected in step 108. The powering down places the selected lightpath in the dim mode described above. The powering down may be such that the lightpath is incapable of transferring any optical signals. Alternatively, the powering down may be such as to enable the lightpath to transfer optical signals at a reduced quality, and/or at a reduced capacity, so that optical signal continuity is maintained in the lightpath but the lightpath is incapable of transferring communication traffic. In the latter case, router R1 may periodically transmit optical signals into the powered down lightpath to check for continuity of the lightpath and/or to maintain the configuration of the lightpath.

Regardless of the manner in which the powering down is implemented, router R1 communicates with the optical network via its signaling protocol so as to reserve the availability of the elements of the lightpath for a possible future powering up of the lightpath. In other words, the router reserves the configuration of the elements of the selected lightpath for possible future powering up. For example, if one of the elements of the selected lightpath comprises an amplifier 26, the powering down may comprise reducing the pump radiation level, while maintaining the ability to increase the pump radiation to the level before the reduction. As another example, if one of the elements comprises a regenerator 30, power to the regenerator is reduced.

Typically, in configuring any given lightpath in step 102, router R1 and the optical network also generate one or more alarms associated with the lightpath, the alarms being used to transfer a warning to operator 17 of a fault in the lightpath. In power down step 112, the alarms are maintained for future powering up of the lightpath, but the alarms are deactivated so that any warning generated because of the powering down of the lightpath is not transferred to the operator.

Thus, for the selected lightpath that has been powered down in step 112, i.e., has been placed in the dim mode, router R1 communicates with the optical layer so as to reserve resources of the dimmed lightpath for future powering up, and so as to deactivate any alarms existing in the dimmed lightpath.

On completion of step 112, there are a reduced number of lightpaths in the link bundle between router R1 and router R2, the reduced number of lightpaths corresponding to a reduced link bundle. As will be apparent from the following description, there is more than one possible reduced link bundle. In the following description, a reduced link bundle is herein generically termed reduced link bundle $LB_{12}(r_n)$, where n is a positive integer used to distinguish different possible reduced link bundles.

With the reduced number of lightpaths in bundle $LB_{12}(r_n)$, the flowchart continues to a second traffic measuring decision 114. Decision 114 performs substantially the same test on the traffic as is performed by decision 106.

If the measurement in decision 114 indicates that the traffic is below threshold LTHRESH for more than preset time period $\Delta T_1$ and that there is more than one lightpath in the bundle, the flowchart returns to the beginning of step 108, so that in ensuing steps, a further lightpath is removed from link bundle $LB_{12}(r_n)$.

If the measurement indicates that the traffic is not below threshold LTHRESH for more than period $\Delta T_1$ or that there is only one lightpath in the bundle, the flowchart continues to a third traffic measuring decision 116. Router R1 uses decision 116 to determine if a lightpath that has been removed from bundle $LB_{12}$ or $LB_{12}(r_n)$ can be returned to the bundle, or if the decisions of steps 114 and 116 are reiterated.

In decision 116 router R1 checks if traffic T, measured in step 114, is greater than an upper threshold UTHRESH for more than a second time period $\Delta T_2$. $\Delta T_2$ is typically configured to be fixed or adaptive according to whether $\Delta T_1$ is fixed or adaptive. Typically, $\Delta T_2$ is configured to be smaller than $\Delta T_1$, so that the network may react quickly in the event of a failure in the network. In one embodiment $\Delta T_2$ is fixed in a range between approximately 1 s and approximately 10 s.

If decision 116 indicates that T is not greater than UTHRESH, the flowchart returns to the beginning of decision 114.

Inspection of the flowchart shows that when decisions 114 and 116 both have negative returns, the flowchart continues to reiterate without adding or subtracting lightpaths to $LB_{12}(r_n)$. The iteration continues as long as traffic T is greater than LTHRESH for time $\Delta T_1$, and is less than UTHRESH for time $\Delta T_2$, i.e., that T lies between LTHRESH1 and UTHRESH except for time periods defined by $\Delta T_1$ and $\Delta T_2$.

If decision 116 indicates that T is greater than UTHRESH, the flowchart continues to a lightpath selection step 118.

In step 118 router R1 selects a lightpath, from those that have been powered down in step 112, to be powered up. If there is more than one such lightpath that has been powered down, the router typically selects the lightpath that results in the smallest amount of additional power being expended in network 10. In some embodiments, the router may use one or more alternative or additional criteria to decide on the lightpath to be powered up, such as the lightpath that has been powered down for the longest time, or the lightpath that has been powered down for the shortest time.

In a power up and rebalance step 120, router R1 powers up the lightpath selected in step 118, and rebalances the traffic between the increased number of lightpaths. Any alarms that had been deactivated in the selected lightpath are reactivated.

Using a decision step 122, router R1 then returns to one of two points in the flowchart. If all lightpaths generated in step 102 are in use, the flowchart returns to the beginning of step 106. If all lightpaths generated in step 102 are not in use, i.e., if there are configured lightpaths which have been powered down, and so are available for powering up, the flowchart returns to the beginning of step 114.

Figure 3:
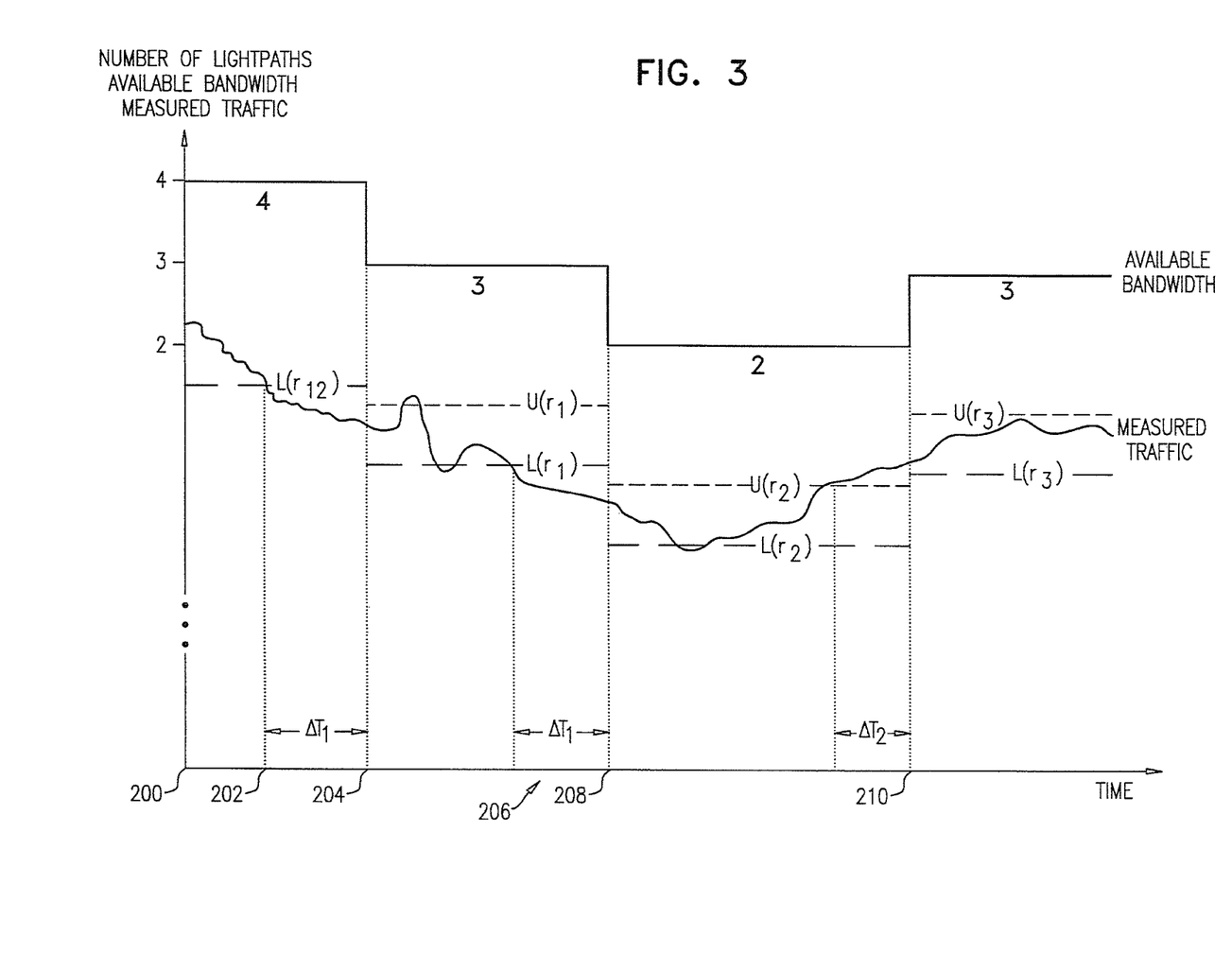
FIG. 3 is a schematic graph illustrating operation of the flowchart of FIG. 2, according to an embodiment.

FIG. 3 is a schematic graph illustrating operation of the flowchart of FIG. 2, according to an embodiment. The horizontal axis of the graph plots time. The vertical axis of the graph plots available bandwidth of a link bundle, and the measured traffic T. The units of both axes are arbitrary. In the graph of the available bandwidth, the number of lightpaths that are transmitting traffic T is also shown.

As described in steps 102, 104 and 106, at a time 200 router R1 analyzes incoming traffic and configures and powers up four lightpaths, corresponding to Tables I-IV, to transmit the traffic. The router balances the traffic and transmits the balanced traffic on the four lightpaths, corresponding to link bundle $LB_{12}$. Router R1 also starts measuring the value of traffic T being in the link bundle, and checks, as in decision 106, if the traffic T is below LTHRESH($LB_{12}$) for a time $\Delta T_1$. For clarity in FIG. 3, the upper and lower thresholds are shown in an abbreviated form. Thus, LTHRESH($LB_{12}$) is shown as L($LB_{12}$).

At a time 202, router R1 determines that T begins to be below LTHRESH($LB_{12}$), and at time 204 the router determines that the traffic has been below the threshold for time $\Delta T_1$. This corresponds to decision step 106 giving a positive return, in which case router R1 implements steps 108, 110; and 112. By way of example it is assumed that router R1 selects lightpath 1 (Table I) for removal from bundle $LB_{12}$. Thus, router R1 rebalances the traffic between lightpaths 2, 3, and 4 (Tables II, III, and IV), which comprise a reduced bundle $LB_{12}(r_1)$. Router R1 then powers down lightpath 1, maintains its configuration, and deactivates any alarms of the lightpath.

From time 204, decision step 114 applies, and if the return of step 114 is negative, decision step 116 applies. In the graph of FIG. 3, it is assumed that the traffic measured in $LB_{12}(r_1)$ moves out of the traffic threshold bounds LTHRESH($LB_{12}(r_1)$) and UTHRESH($LB_{12}(r_1)$) for relatively short periods of time, until in a time period 206 it falls below LTHRESH($LB_{12}(r_1)$) for a time $\Delta T_1$. (LTHRESH($LB_{12}(r_1)$) and UTHRESH($LB_{12}(r_1)$) are respectively abbreviated in the graph as L($r_1$) and U($r_1$).) Thus, the iterative path of the flowchart described above between decisions 114 and 116 applies until the end of period 206, at a time 208.

At time 208, decision step 114 gives a positive return, so that the iterations described above end, and router R1 implements steps 108, 110, and 112 to remove an additional lightpath from already reduced bundle $LB_{12}(r_1)$. It is assumed that router R1 selects lightpath 2 (Table II) for removal from bundle $LB_{12}(r_1)$, and so rebalances the traffic between lightpaths 3 and 4, which comprise a further reduced bundle $LB_{12}(r_2)$. Router R1 then powers down lightpath 2, maintains its configuration, and deactivates any alarms of the lightpath.

From time 208 to a time 210 router R1 follows the iterative path of the flowchart between steps 114 and 116, as described above. During this time period, router R1 uses thresholds LTHRESH($LB_{12}(r_2)$) and UTHRESH($LB_{12}(r_2)$) for steps 114 and 116. (LTHRESH($LB_{12}(r_2)$) and UTHRESH($LB_{12}(r_2)$)) are respectively abbreviated in the graph as L($r_2$) and U($r_2$).)

At time 210, it is assumed that the traffic has been above threshold bound UTHRESH($LB_{12}(r_2)$) for a period $\Delta T_2$, so that decision step 116 returns a positive answer, ending the iterations followed between steps 114 and 116.

At time 210 router R1, in step 118, selects one of the powered down lightpaths to be powered up. At time 210 there are two powered down lightpaths available, i.e., lightpath 1 and lightpath 2. The selection may be performed according to any convenient criterion, such as the lightpath that has been powered down for the shortest time, the lightpath that has been powered down for the longest time, or the lightpath which, on being powered up, dissipates the least extra power. Other criteria that may be used for the selection, such as those wherein the lightpath is determined on the basis of the bandwidth of the lightpath, will be apparent to those having ordinary skill in the art, and are included in the scope of the disclosure.

By way of example, it is assumed that at time 210 router R1 selects lightpath 1 to be powered up. Thus, in step 120 the router powers up lightpath 1 to form a-new reduced link bundle $LB_{12}(r_3)$, consisting of lightpaths 1, 3, and 4, and the router rebalances the traffic for the new reduced link bundle. From time 210 traffic is transmitted through reduced link bundle $LB_{12}(r_3)$, and the flowchart returns to the beginning of decision 114, since in decision 122 are lightpaths initially configured by router R1 are not in use. From time 210, router R1 iterates decision steps 114 and 116, using thresholds LTH-RESH($LB_{12}(r_3)$), abbreviated to $L(r_3)$, and UTHRESH($LB_{12}(r_3)$), abbreviated to $U(r_3)$, for the decision steps.

It will be appreciated that the embodiments described above are cited by way of example, and that the disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. A method for communicating optically between nodes of an optical network, comprising:
   forming, between a first node and a second node of the network, a set of lightpaths;
   transferring communication traffic between the first and second nodes via the set of lightpaths;
   determining, for the set of lightpaths, that a communication traffic level associated therewith is less than a predetermined threshold;
   in response to the determination, removing a lightpath from the set of lightpaths to form a reduced set of lightpaths;
   transferring the communication traffic between the first and second nodes via the reduced set of lightpaths, while reducing a level of power consumption in the removed lightpath;
   forming a further determination for the reduced set of lightpaths that the communication traffic level associated therewith is less than a further predetermined threshold;
   in response to the further determination, removing an additional lightpath from the reduced set of lightpaths to form a further reduced set of lightpaths; and
   transferring the communication traffic between the first and second nodes via the further reduced set of lightpaths, while reducing a level of power consumption in the further removed lightpath.

2. The method according to claim 1, and comprising:
   forming a yet further determination for the further reduced set of lightpaths that the communication traffic level associated therewith is greater than a yet further predetermined threshold;
   in response to the yet further determination, powering up one of the further removed lightpath and the removed lightpath, and adding the one powered up lightpath to the further reduced set of lightpaths to form a new reduced set of lightpaths; and
   transferring the communication traffic between the first and second nodes via the new set of lightpaths.

3. The method according to claim 2, wherein powering up the one lightpath of the further removed lightpath and the removed lightpath comprises selecting between the removed lightpath and the further removed lightpath according to a criterion chosen from a group of criteria comprising:
   the one lightpath requiring a smallest amount of additional power for powering up;
   the one lightpath that has been powered down for a longest time; and
   the one lightpath that has been powered down for a shortest time.

4. A method for communicating optically between nodes of an optical network, comprising:
   forming, between a first node and a second node of the network, a set of lightpaths;
   transferring communication traffic between the first and second nodes via the set of lightpaths;
   determining, for the set of lightpaths, that a communication traffic level associated therewith is less than a predetermined threshold;
   in response to the determination, removing a lightpath having a given configuration from the set of lightpaths to form a reduced set of lightpaths; and
   transferring the communication traffic between the first and second nodes via the reduced set of lightpaths, while reducing a level of power consumption in the removed lightpath and while maintaining the given configuration of the removed lightpath.

5. The method according to claim 4, wherein transferring the communication traffic via the set of lightpaths comprises balancing the communication traffic between the set of lightpaths, and wherein removing the lightpath comprises rebalancing the communication traffic between the reduced set of lightpaths prior to reducing the level of power consumption in the removed lightpath.

6. The method according to claim 5, wherein the balancing and rebalancing are performed according to at least one of a link aggregation control protocol and an equal cost multi-path routing strategy.

7. The method according to claim 5, wherein the balancing and rebalancing are performed using inverse multiplexing.

8. The method according to claim 4, wherein transferring the communication traffic via the set of lightpaths comprises balancing the communication traffic between the set of lightpaths, and wherein forming the determination comprises determining that there is no traffic on a given lightpath of the set, and wherein removing the lightpath comprises removing the given lightpath from the set without rebalancing the traffic.

9. The method according to claim 4, wherein reducing the level of power consumption comprises reducing the level so that the removed lightpath is incapable of transferring optical signals between the first and second nodes.

10. The method according to claim 4, wherein reducing the level of power consumption comprises selecting the reduced level so that the removed lightpath is able to transfer optical signals between the first and second nodes and is unable to transfer communication traffic therebetween.

11. The method according to claim 4, wherein the first node comprises a first switch and wherein the second node comprises a second switch, and wherein removing the lightpath comprises selecting a given lightpath so that powering down the given lightpath implements at least one of a group of actions comprising:

provi­ding a largest reduction in power consumption of the set of the lightpaths between the first and second switches;

reducing an operational lifetime of an element in the given lightpath; and enabling a network interface card of the first switch to be completely turned off.

12. The method according to claim 4, and comprising:

forming a further determination for the reduced set of lightpaths that the communication traffic level associated therewith is greater than a further predetermined threshold;

in response to the further determination, powering up the removed lightpath, and adding the powered up removed lightpath to the reduced set of lightpaths to form the set of lightpaths; and transferring the communication traffic between the first and second nodes via the set of lightpaths.

13. An apparatus, comprising:

a first node of a network, which is configured to:

form a set of lightpaths to a second node of the network, transfer communication traffic between the first and second nodes via the set of lightpaths, form a determination for the set of lightpaths that a communication traffic level associated therewith is less than a predetermined threshold, in response to the determination, remove a lightpath from the set of lightpaths to form a reduced set of lightpaths, and transfer the communication traffic between the first and second nodes via the reduced set of lightpaths, while reducing a level of power consumption in the removed lightpath.

14. The apparatus according to claim 13, wherein transferring the communication traffic via the set of lightpaths comprises balancing the communication traffic between the set of lightpaths, and wherein removing the lightpath comprises rebalancing the communication traffic between the reduced set of lightpaths prior to reducing the level of power consumption in the removed lightpath.

15. The apparatus according to claim 13, wherein transferring the communication traffic via the set of lightpaths comprises balancing the communication traffic between the set of lightpaths, and wherein forming the determination comprises determining that there is no traffic on a given lightpath of the set, and wherein removing the lightpath comprises removing the given lightpath from the set without rebalancing the traffic.

16. The apparatus according to claim 13, wherein reducing the level of power consumption comprises reducing the level so that the removed lightpath is incapable of transferring optical signals between the first and second nodes.

17. The apparatus according to claim 13, wherein reducing the level of power consumption comprises selecting the reduced level so that the removed lightpath is able to transfer optical signals between the first and second nodes and is unable to transfer communication traffic therebetween.

18. The apparatus according to claim 13, wherein the first node comprises a first switch and wherein the second node comprises a second switch, and wherein removing the lightpath comprises selecting a given lightpath so that powering down the given lightpath implements at least one of a group of actions comprising:

providing a largest reduction in power consumption of the set of the lightpaths between the first and second switches;

reducing an operational lifetime of an element in the given lightpath; and enabling a network interface card of the first switch to be completely turned off.

19. The apparatus according to claim 13, wherein the first node is configured to:

form a further determination for the reduced set of lightpaths that the communication traffic level associated therewith is greater than a further predetermined threshold;

in response to the further determination, power up the removed lightpath, and add the powered up removed lightpath to the reduced set of lightpaths to form the set of lightpaths; and transfer the communication traffic between the first and second nodes via the set of lightpaths.

20. The apparatus according to claim 19, wherein the first node is further configured to:

form a yet further determination for the further reduced set of lightpaths that the communication traffic level associated therewith is greater than a yet further predetermined threshold;

in response to the yet further determination, power up one of the further removed lightpaths and the removed lightpath, and add the one powered up lightpath to the further reduced set of lightpaths to form a new reduced set of lightpaths; and transfer the communication traffic between the first and second nodes via the new set of lightpaths.

* * * * *